United States Patent [19]

Barnett et al.

[11] 4,440,978
[45] Apr. 3, 1984

[54] UNIVERSAL MEASURED SERVICE INTERFACE FOR STEP-BY-STEP TELEPHONE EXCHANGES

[75] Inventors: Mark L. Barnett, Bothell; John C. Owens, Issaquah, both of Wash.

[73] Assignee: Telematic Products, Inc., Redmond, Wash.

[21] Appl. No.: 397,464

[22] Filed: Jul. 12, 1982

[51] Int. Cl.³ .......................................... H04M 15/06
[52] U.S. Cl. ................................. 179/5.5; 179/7.1 R; 179/17 A; 179/18 FH
[58] Field of Search ............. 179/7.1 R, 18 FH, 17 A, 179/27 DB, 5.5, 89

[56] References Cited

PUBLICATIONS

R. Cohen, J. B. Connell; Subscriber Billing System; Electrical Communication, vol. 55, No. 1, 1980, pp. 192-201.

Primary Examiner—Stafford D. Schreyer
Attorney, Agent, or Firm—Seed and Berry

[57] ABSTRACT

A universal measured service system for a central office exchange senses the condition of relays in the line equipment for each line as well as the conditions of the linefinders. The system associates the outgoing lines of each linefinder with the incoming line connected to the linefinder by identifying an incoming line placing a call that is connected to a linefinder in the exchange at about the same time that a specific linefinder has connected an incoming line to its outgoing line. Once an incoming line has been identified as being connected to an outgoing line of the linefinder, the number called through the incoming line can be determined by counting the dial pulses on the linefinder outgoing line. The system is also capable of accommodating 200-line linefinders arranged in subgroups by also sensing signals from the linefinder group relays identifying which subset of incoming lines is being accessed by the linefinders.

9 Claims, 11 Drawing Figures

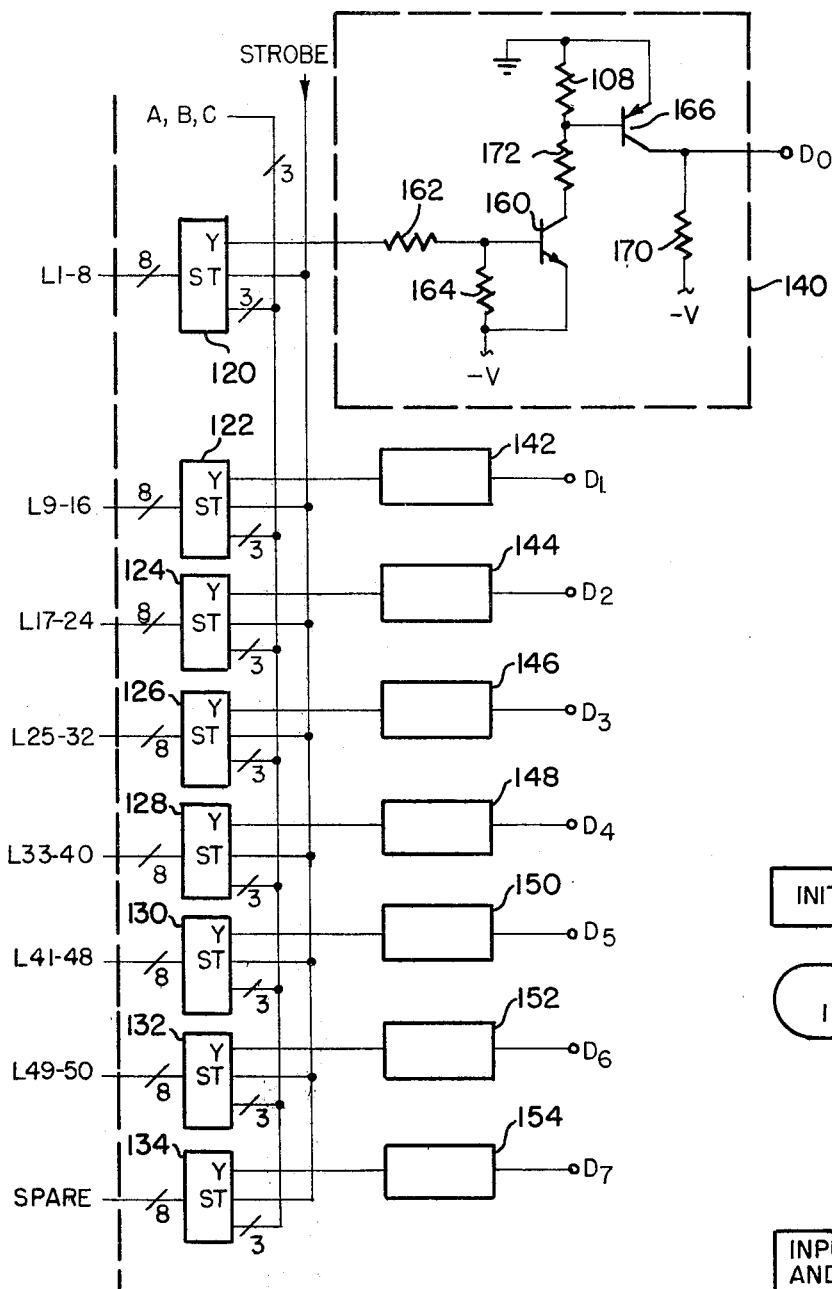
FIG. 4B
FIG. 5A
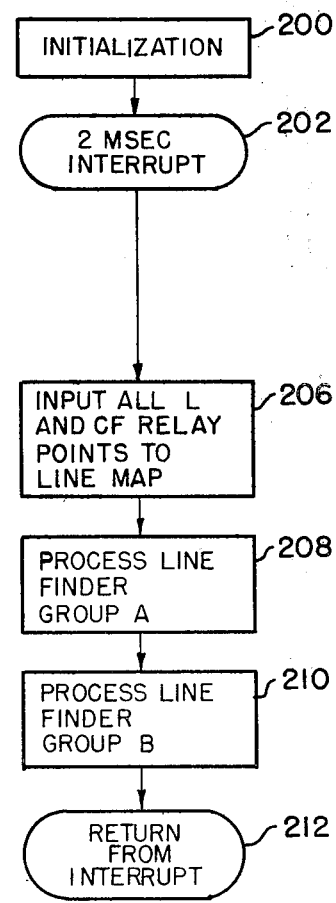

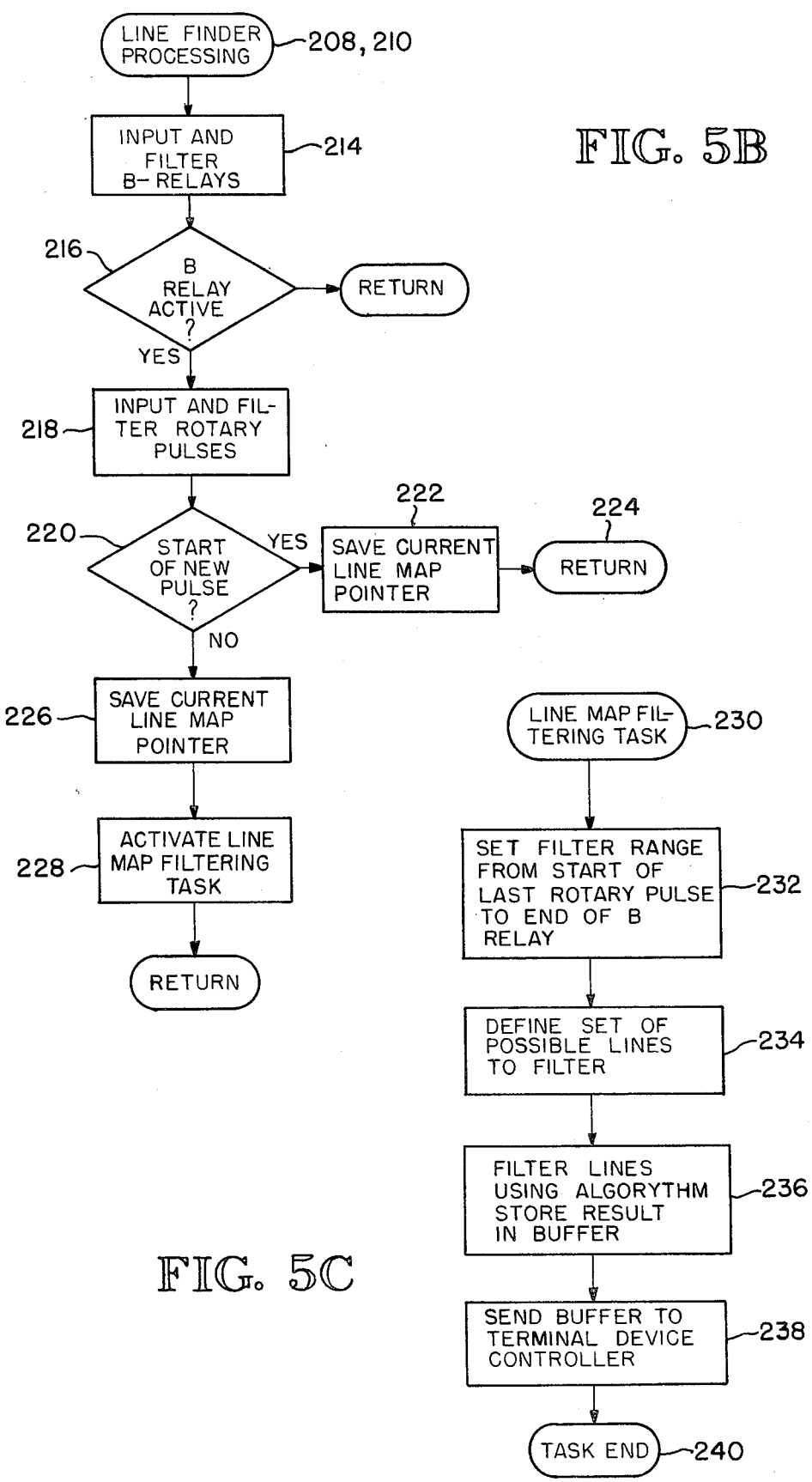

UNIVERSAL MEASURED SERVICE INTERFACE FOR STEP-BY-STEP TELEPHONE EXCHANGES

DESCRIPTION

1. Technical Field

This invention relates to telephone equipment, and more particularly, to a system for recording telephone call data for all calls handled by a telephone exchange.

2. Background Art

Telephones in residences and businesses are interconnected through a telephone central office exchange which, in appropriate cases, also records certain data relating to the call. For example, it is common for access to a long-distance trunk line to be obtained by preceding a called number with the digit "1". However, a "1" preceding the called number also activates data recording equipment which records such information as the calling number, the called number, the duration of the call, and the date and time of day of the call.

Traditionally, separate charges have been made only for long-distance calls in which the called number is preceded by a "1". However, there is an increasing need to record called data for even local or non-toll calls. As explained in greater detail hereinafter, the systems for recording call data for long-distance calls are not suitable for recording call data for all calls passing through an exchange. Nor can such equipment be easily adapted to provide this function. Although an entirely new switching system could undoubtedly be designed to provide universal measured service, i.e., call data recording for all calls, the large capital investment in existing telephone equipment makes it necessary that the universal measured service system be capable of working with existing equipment.

In a conventional "step-by-step" central office, incoming lines from respective telephone stations are normally arranged in 200-line groups. Variations of the 200-line/20-linefinder arrangement are often used. The inventive universal measured service system is easily adaptable to other line/linefinder arrangements also. Each group of lines is further divided into two subgroups: namely, group A and group B. All of the lines in the 200-line group are applied to a number of "linefinders" which connect the incoming lines to the outgoing line of a linefinder. Although a variety of linefinder-type devices are sold, one such device sold by Automatic Electric is described in "Technical Bulletin 948-821." The principle of the linefinder is that at no one time will all subscribers of a telephone exchange use their telephone simultaneously. Therefore, an automatic exchange need accommodate just a fraction of the subscribers at any one time. Since there are fewer outgoing lines or "links" than incoming lines, the links can be placed in a pool to be used by the incoming lines as needed. Consequently, a relatively small number of linefinders, usually twenty, can be used to accommodate a 200-line group.

Each linefinder includes three banks of rotary switches, an upper bank, a lower bank and a control bank. Each bank includes ten vertically stacked, contact rotary switches or "levels," each level having ten pairs of contacts for the tip and ring lines. Thus, each linefinder can connect to any one of 200 incoming lines. The linefinder normally moves a contact vertically up to the rotary switch associated with an incoming line attempting to access the exchange. The linefinder then steps from one contact of the rotary switch to another until it makes contact with the incoming line. The first 100 incoming lines are connected to the lower banks of both the group A and group B linefinders, and the second 100 incoming lines are connected to the upper banks of both the group A and group B linefinders. The incoming lines are connected to the group A linefinders in consecutive order so that line 1 is connected to the first rotary contact in the first level of the lower bank and line 100 is connected to the last (tenth) rotary contact in the tenth level of the lower bank. Similarly, line 101 is connected to the first rotary contact in the first level of the upper bank and line 200 is connected to the last (tenth) rotary contact in the tenth level of the upper bank. The incoming lines are connected to the group B linefinders in reverse order so that line 1 is connected to the first contact in the tenth rotary switch of the lower bank and line 100 is connected to the last (tenth) rotary contact in the first level of the lower bank. Similarly, line 101 is connected to the first rotary contact in the tenth level of the upper bank and line 200 is connected to the last (tenth) rotary contact in the first level of the upper bank. The linefinders normally utilize only their lower five rotary switches or levels. Thus, the group A linefinders normally access lines 1–50 in their lower bank and lines 101–150 in their upper bank. The group B linefinders normally access lines 51–100 in their lower bank and lines 151–200 in their upper bank. However, when all of the linefinders in group A are in use, the group B linefinders can step to the upper five rotary switches to access the low order set of lines. Similarly, when all of the linefinders in group B are in use, the group A linefinders can step to the upper five rotary switches to access the high order set of lines.

In a step-by-step exchange, the linefinders normally apply the incoming lines to a "first selector," either directly or after passing through a tone-to-pulse decoder which converts conventional dual-tone multifrequency (DTMF) signaling tones to dial pulses. The first selector steps vertically one time for each dial pulse received in the first digit. It then rotary hunts for an available line to a succeeding switch. The incoming line then gets passed to the next switch. Normally, toll equipment is found on the first level of the selector. When the called number is a "1", a call detail recorder is actuated that performs a number of functions. First, it triggers an automatic number identifier that determines the calling number. Basically, it performs this function by injecting a signal on the CF lead and then examining the incoming lines for the presence of this signal. The call detail recorder then records the calling number, and by counting the number of dial pulses on the link as the called number is dialed, records the called number. Finally, the call detail recorder records the duration of the call and the data and time of the call. The remaining outputs of the first selector are applied to subsequent selectors which sequentially connect the incoming line to the appropriate outgoing line to the called station in a step-by-step process.

The approach used for recording call data for long-distance calls cannot be used for recording call data for all incoming calls because the large number of such calls would require an impractically fast automatic number-identifying device. Although a separate automatic number-identifying device could be permanently attached to each incoming line, the shear number of such incoming lines makes the cost of this approach prohibitive. Automatic number-identifying devices could be placed on the links, or outgoing lines, of each linefinder, which would reduce the cost considerably because of the relatively small number of linefinders used for each 200-line group. However, the fact that the linefinder can be connected to any one of 200 lines makes it impossible for the automatic number-identifying device to determine the calling number associated with the called number.

Another approach to identifying the calling number would be to examine the signals which cause the linefinder switches to step from one rotary switch or level to the next and then step along the contacts of the selected rotary switch. This approach is theoretically possible because the line finder generates pulses on a "vertical" signal line as the line finder steps from one level to the next. Similarly, pulses are generated on a "rotary" signal line as the switch steps from one rotary contact to the next. The incoming line, and hence "calling station," could thus be theoretically determined by counting the number of vertical and rotary pulses. However, in practice, the linefinder may stick or the vertical and rotary may go out of adjustment, thus requiring two or more pulses to progress the linefinder from one level to the next or from one contact of a rotary switch to the next. This would result in billing the wrong number, without any way of knowing if the data received is accurate. Pulse counting would require periodic maintenance and adjustment of the vertical and rotary magnets by central office personnel. Thus, the need exists for a relatively inexpensive system for recording call data for all incoming calls without replacing or substantially modifying the switching equipment presently used in a telephone central office exchange.

DISCLOSURE OF THE INVENTION

It is an object of the invention to provide a universal measured service call detail recorder which does not require any modification of existing equipment in a central office exchange.

It is still another object of the invention to provide a system for determining a calling number without using individual calling number identifiers for each incoming line.

It is a further object of the invention to provide a universal measured service telephone exchange which transfers call data to a central computer for subsequent processing.

It is a still further object of the invention to provide a universal measured service system for a central office exchange which is capable of operating with line finders divided into subgroups, each of which is capable of accessing lines normally accessed by the other subgroup.

These and other objects of the invention are provided by a switching system for a central office exchange having a number of linefinders, each connecting one of several incoming lines to an outgoing line of the linefinder. Each of the linefinders has a "B-relay" that is energized when the linefinder is attempting to connect an incoming line to an outgoing line. The central office exchange also includes line equipment having a line relay and a cut-off relay for each incoming line. The cut-off relay is energized as long as the linefinder is connecting the corresponding incoming line to the outgoing line of the line-finder and as long as this call is in progress. The line relay is energized when the station connected to the incoming line is placing a call and the cut-off relay is not yet energized. Thus, when the station is placing a call, the line relay is first energized until the linefinder connects the incoming line to an outgoing line, thereby energizing the cut-off relay and de-energizing the line relay. A call received by the station causes that station's cut-off relay to be energized. The energized cut-off relay then prevents the line relay for that station from being energized when the station connected to the line goes "off hook." Thus, a predetermined sequence of operation occurs in each incoming line's line relay and cut-off relay. This pattern of operation occurs only when the station is placing a call and it is not duplicated during a call or when the station is receiving a call. Moreover, since only one linefinder in a group can be searching for an incoming line at a time, the above-described sequence of events can occur for only one incoming line in each subgroup of lines at a time. Basically, the universal measured service system examines the cut-off and line relays for all lines to detect this predetermined operating pattern to identify which incoming lines are currently being searched for and then found by a linefinder. At the same time, signals from the linefinders indicating that a linefinder is currently searching for an incoming line are also examined. The system associates an incoming line with a specific linefinder by looking for a line being connected to a linefinder within a predetermined time that a specific linefinder is being connected to an incoming line. Called number-identifying devices thus need only be placed on the relatively small number of outgoing lines of the linefinders in order to associate a called number with a calling number. Many central office exchanges utilize linefinders which are connected to the incoming lines in two subgroups so that the linefinders in one subgroup can, in appropriate circumstances, access the incoming lines of the other linefinder subgroup. Under these circumstances, signals indicative of which subgroup the linefinders are accessing are also examined to uniquely identify the linefinder that is accessing a specific incoming line.

BRIEF DESCRIPTION OF THE DRAWINGS

FIGS. 4A and 4B are schematics of the multiplexers used in the system of FIG. 1.

FIGS. 5A, 5B, 5C, 5D, and 5E are flow charts of the software controlling the operation of the microprocessor-based calling number identifier used in the system of FIG. 1.

BEST MODE FOR CARRYING OUT THE INVENTION

Figure 1:
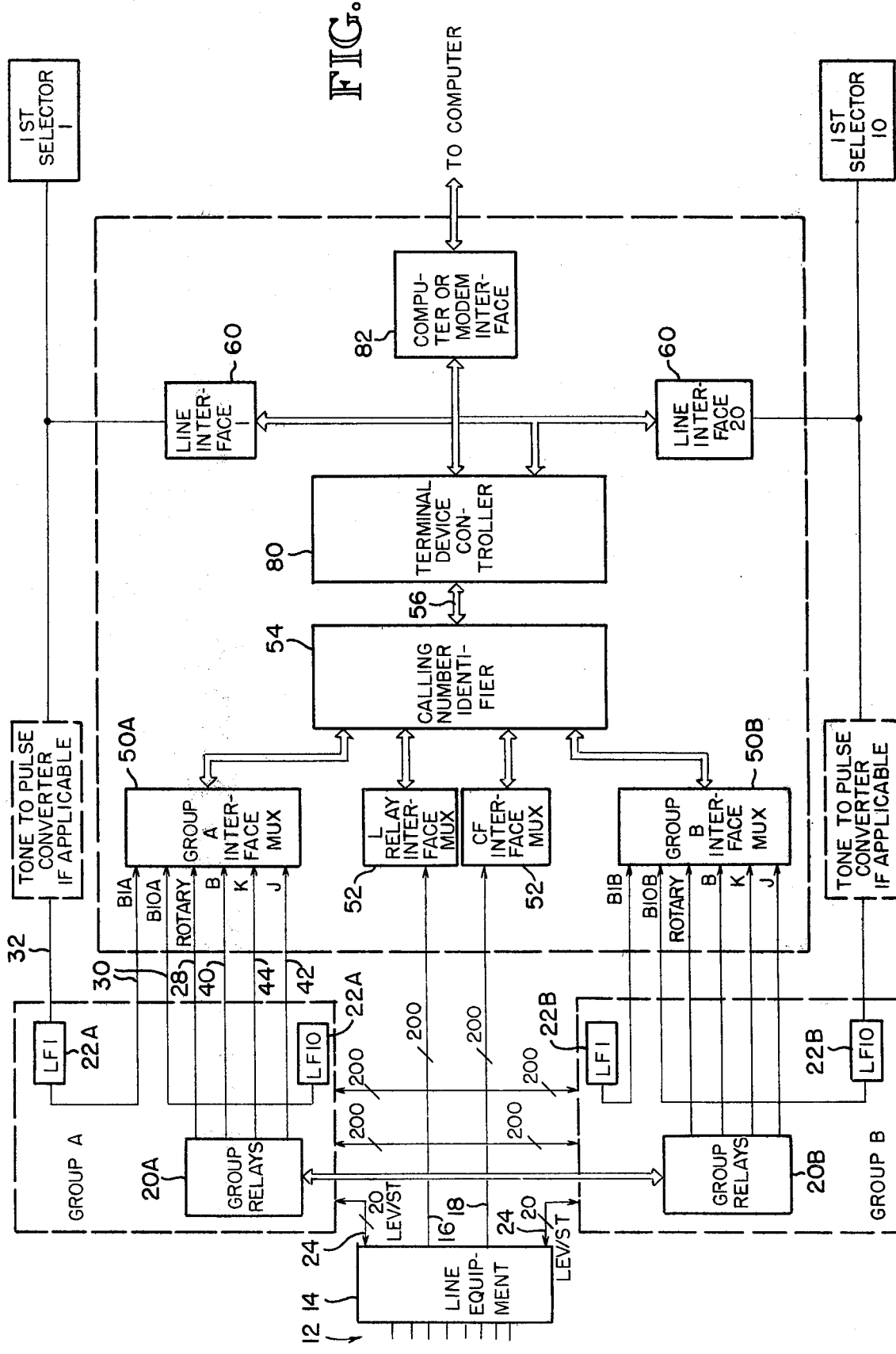
FIG. 1 is a block diagram of the universal measured service call data recorder.

A typical central office exchange utilizes a large number of standardized devices for interconnecting a large number of incoming lines to other lines and for recording call data in appropriate cases. Incoming lines 12 are often arranged in groups of 200. The incoming lines 12 are connected to line equipment 14, which normally includes a line relay and a cut-off relay for each line. The line relay is typically energized whenever the station connected to the corresponding incoming line goes "off hook." At that time, the corresponding L-relay line 16 goes active. Thus, for 200 incoming lines 12, 200 line relays are used to produce 200 signals on 200 respective L relay lines 16. The cut-off relay for each line is energized whenever the incoming line is connected to an outgoing line 32 by a linefinder. Energization of the cutoff relay for a line also de-energizes the line relay for that line. Thus, when a call is placed by a station, the line relay corresponding to the incoming line 12 connected to that station is initially energized until the line is connected to an outgoing line by a linefinder. The line relay is then de-energized by energization of the cut-off relay. However, when a call is being received by that station, the cut-off relay is energized before the called station goes "off hook" so that the line relay is never energized. As explained in greater detail hereinafter, it is this feature which allows the system to differentiate between incoming and outgoing calls and to measure the service on only incoming calls placed by a station.

As indicated above, the linefinders associated with each 200 lines are frequently divided into subgroups, A and B. Each group A and B includes a set of group relays 20 and a plurality of linefinders 22. When a call is placed, energization of the line relay applies a LEV-ST signal through line 24 to the linefinder to mark the rotary switch or "level" corresponding to the incoming line. The LEV-ST signal on line 24 also energizes one of the group relays 20, and the group relay 20 then selects one of the linefinders 22 that is not already connected to an incoming line. The switching mechanism in the selected linefinder 22 then rises to the vertical position marked by the LEV-ST signal on line 24. Thus, the thirty-second incoming line 12 marks the third level in the selected group A linefinder. When the linefinder switching mechanism reaches the level corresponding to the incoming line, it steps from contact to contact in the selected rotary switch. At this time, the group relays 20 output a pulse on the ROTARY line 28 for each such step. During the time that the linefinder 22 is searching for the incoming line, its "B-relay" is energized, thereby generating a signal on its B line 30. When the linefinder 22 has found the incoming line 12, a circuit is completed through the CF line for that incoming line 12, thereby energizing the cut-off relay for that incoming line 12. The cut-off relay then de-energizes the corresponding line relay. A short time thereafter, the B-relay for the selected linefinder is also de-energized. At this time, the incoming line 12 is connected to an outgoing line 32 or "link" through a selected linefinder.

Figure 2:
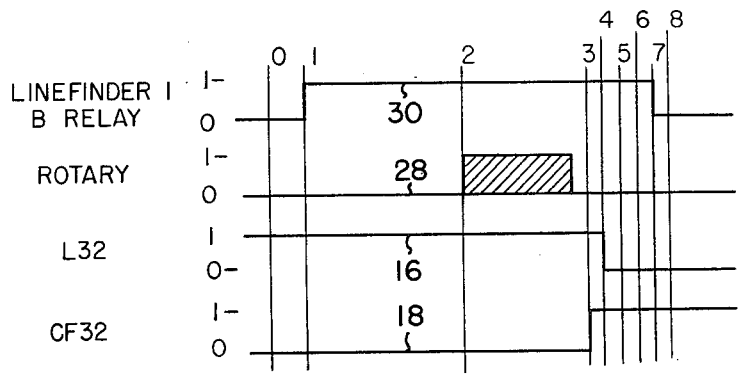
FIG. 2 is a timing diagram of various waveforms found in the system of FIG. 1.

The sequence of operation is best reviewed with reference to the timing diagram of FIG. 2. At time $T_0$, the L relay line 16 for line 32 is energized, thereby indicating that the station connected to line 32 is "off hook." At the same time, the CF line 18 for line 32 is inactive, thus indicating that the station is placing a call rather than receiving a call. If the station were receiving a call, the CF line 18 for line 32 would be active, thus de-energizing the line relay for line 32 and holding the L relay line 16 for line 32 inactive. When the L relay line 16 for line 32 goes active, the LEV-ST signal on line 24 energizes one of the group relays 20, which, in turn, selects a non-busy linefinder and energizes the B-relay of that linefinder at time $T_1$. Previous thereto, however, the LEV-ST signal on line 24 has also marked the level of the incoming line on all of the linefinders. Thus, the linefinder steps vertically until it finds the LEV-ST signal during the time from $T_1$ to $T_2$. At $T_2$, the linefinder has reached the proper vertical level and is now stepping horizontally from one contact of the switch to the next. During this time, rotary pulses are generated on the ROTARY line 28 corresponding to the number of horizontal steps. In the example given, in which the thirty-second incoming line 12 is "off hook," only two pulses would normally occur on ROTARY line 28 during the indicated period subsequent to $T_2$. By time $T_3$, the linefinder has found the incoming line 32 so that the cut-off relay for the line 32 is energized, thereby causing the CF 32 line 18 to become active. Energization of the cut-off relay de-energizes the line relay at $T_5$, thereby causing the L relay line 16 for line 32 to become inactive. De-energization of the line relay for line 32 then de-energizes the B-relay for the selected linefinder at $T_7$ through the group relays 20. The L relay lines 16, CF lines 18, and B-relay lines 30 thus change state in a predetermined pattern at times $T_3$, $T_5$, and $T_7$ when a call is placed. By examining the L relay lines 16, CF lines 18, and B-relay lines 30 at appropriate times, namely, at $T_4$, $T_6$, and $T_8$, the identity of a linefinder and the identity of a predetermined incoming line connected to that linefinder can be determined. As explained in greater detail hereinafter, this allows the called number-identifying device to be placed on the relatively few outgoing lines of the linefinders and still allow the called number to be identified with the appropriate calling number. Note, once again, that a call being placed is indicated when an L relay line 16 and the CF line 18 for the same incoming line 12 are first active at the same time and the L relay line 16 thereafter becomes inactive while the CF line 18 for that incoming line 12 remains active. This pattern of operation indicates that the incoming line has just been connected to some linefinder, which, at that time, is yet unknown. However, the B-relay of a linefinder becoming inactive is an indication that the linefinder has just connected to an incoming line 12 to the linefinder's outgoing line 32. Insofar as only one linefinder in a group can be in the process of accessing an incoming line 12 at one time, the B-relay of a known linefinder going inactive just after a known incoming line 12 has been connected to some line finder inherently identifies the incoming line 12 and the linefinder 22 with each other. This, of course, also identifies the incoming line 12 that is connected to the outgoing line 32 of the linefinder 22. An appropriate called number-detecting device can then be placed on each outgoing line 32 of the twenty linefinders to identify called numbers with the line 12 placing of the call.

It will be recalled that the incoming lines 12 are divided into subgroups A and B, and all 200 lines are applied to both groups. Each linefinder 22 utilizes ten vertically stacked rotary switches on levels in each of three banks. Each level or rotary switch has ten positions. Each linefinder thus has 600 contacts, 200 of which are normally accessed by that linefinder in the first five levels of each bank, the second 200 of which are only accessed when all linefinders in the other group are busy in the second five levels of each bank, and the third 200 of which are control leads. The first set of 50 incoming lines 12 are connected to the contacts in the lower five levels in the lower bank of the A group linefinders and to the upper five levels in the lower bank of the B group linefinders. The second set of 50 incoming lines 12 (i.e., lines 51–100) are connected to the top five levels in the lower bank of the A group linefinders and to the lower five levels in the lower bank of the B group linefinders. The third set of incoming lines 12 (i.e., lines 101–150) are connected to the contacts in the lower five levels in the upper bank of the A group linefinders and to the contacts in the upper five levels in the upper bank of the B group linefinders. Finally, the fourth set of incoming lines (i.e., lines 151-200) are connected to the contacts in the upper five levels in the upper bank of the A group linefinders and to the lower five levels in the upper bank of the B group linefinders. The linefinders in each group normally access only the contacts in the lower five levels of each bank of the linefinders. Thus, the A group linefinders normally access only incoming lines 1-50 and 101-150. Similarly, the B group linefinders 22 normally access only incoming lines 51-100 and 151-200. However, in the event that a call is placed by one of the incoming lines 1-50 or 101-150 and all of the linefinders in group A are already connected to an incoming line, the linefinders in group B can step up to the next five levels to access the incoming line.

The group relays 20 include B, J and K relays, which generate respective output signals on lines 40, 42 and 44, respectively. When the linefinders in a group are accessing the incoming lines through their bottom five levels in either bank, the J line 42 for that group is active. When the linefinder for a group is accessing lines through its upper five levels in either bank, the K line 44 (instead of the J line 42) is active. If both J and K are active, the upper bank will be selected. When all of the linefinders in a group are busy, the group B relay for that group is inactive. As explained in greater detail below, by examining the J, K and B group relays 20 through lines 40,44,44, the incoming line currently being accessed by a linefinder in a group can be isolated to a set of 50 lines. Thus, for example, for the A group, an active J line 42 (designating the first five levels of either bank) and an active B line 40 (designating the lower bank of levels) means that the linefinder is accessing the first five levels in the lower bank, or incoming lines 1-50. The same condition (i.e., J line 42 active and B line 40 active) for a B group linefinder would designate lines 51-100. An active K line 44 and an active B line 40 for a group A linefinder would designate that lines 101-150 are being accessed through the lower five levels of the upper bank. Isolating the incoming lines being accessed to a group of 50 in this manner allows more efficient processing of data, as explained in greater detail hereinafter.

The B-relay lines 30 of the linefinders 22 are applied to a group A interface multiplexer 50 along with the rotary pulses on line 28, the group B relay line 40, and the group J and K lines 42,44, respectively. Similarly, the L relay lines 16 are connected to an L relay interface multiplexer 52 and the CF lines 18 are connected to a CF interface multiplexer 52. These multiplexers are applied to a microprocessor which operates as a calling number identifier 54. As is well known in the art, the microprocessor 54 generates a byte on an address bus which causes the appropriate multiplexer 50,52 to connect signals applied to their inputs to the data bus of the microprocessor. In this manner, and operating at a high rate of speed, the microprocessor 54 can check each of the lines applied to their inputs at a rate which, as a practical matter, is effectively continuous. The microprocessor 54 thus detects the conditions outlined above and illustrated in FIG. 2 which indicate that an identifiable incoming line 12 is being connected to an identifiable linefinder 22. The microprocessor 54 thus applies digital data to its output bus 56, which identifies a linefinder 22 and the associated line number connected to that linefinder.

Figure 3:
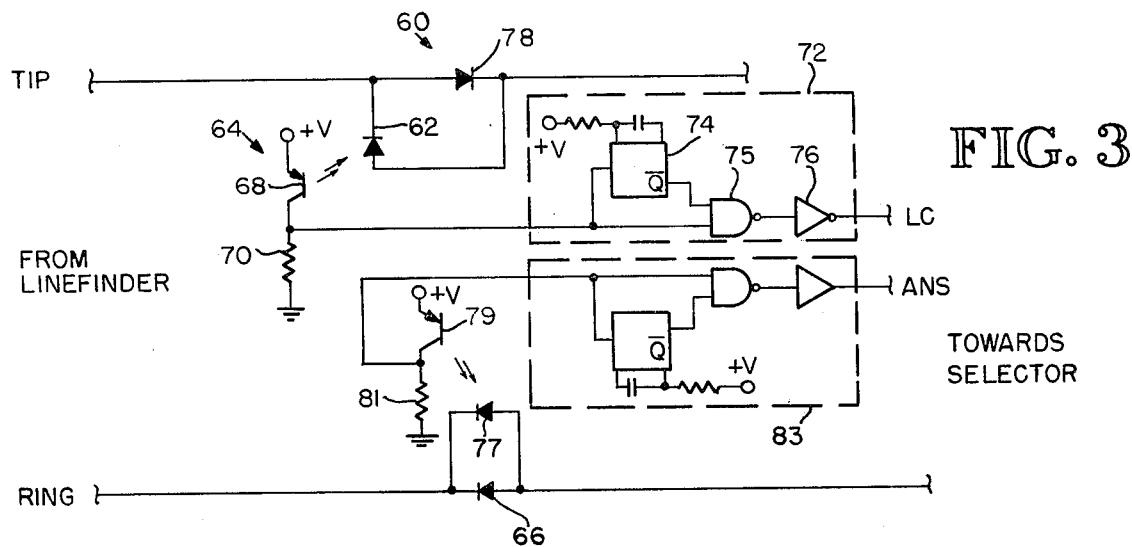
FIG. 3 is a schematic of the line interface circuits used in the system of FIG. 1.

In order to determine the number being called on the outgoing lines of the linefinder 22, a line interface 60 is connected to the outgoing lines of each line finder 22. The line interface circuit, as illustrated in FIG. 3, generates a loop current (LC) signal whenever loop current is flowing through the tip and ring lines in the forward direction and an answer signal (ANS) whenever the current flows through the tip and ring lines in the reverse direction when the called party answers the call. When current is flowing in the forward direction, current flows through the light-emitting diode 62 of an optoisolator 64 and returns through a conventional diode 66. Current flowing through the light-emitting diode 62 turns on phototransistor 68 of the optoisolator 64, thereby placing a high on the collector of the transistor 68, which is normally held low through resistor 70. The low-to-high transition from the collector of transistor 68 is applied to a noise filter and buffer circuit 72, consisting of a retriggerable one-shot 74, a NAND-gate 75, and an inverting buffer amplifier 76. The high applied to the one-shot 74 causes the Q output to disable NAND-gate 75 so that the output of the inverting buffer 76 is low. After the signal applied to the one-shot 74 and gate 75 has remained high for a predetermined period, the Q output of the one-shot 74 goes high, thereby enabling NAND-gate 75 to generate a high loop current (LC) signal at the output of inverting buffer 76. In the event that excessive noise is appearing on the tip and ring lines, the one-shot 74 will be repetitively retriggered, thereby continuously disabling the NAND-gate 75 and preventing the generation of an LC signal.

In a similar manner, in the reverse current condition, current flows through light-emitting diode 77 and returns through conventional diode 78. The light-emitting diode 77 saturates phototransistor 79, thereby drawing current through resistor 81 and triggering a noise filter and buffer circuit 83 that operates in the same manner as the noise filter and buffer circuit 72 described above. Other loop current and reverse current detectors of conventional design may also be employed.

The outputs of the line interface circuit 60 are applied to a microprocessor-based terminal device controller 80. The microprocessor of the terminal device controller 80 is separate from the microprocessor of the calling number identifier 50 since the calling number identifier 50 must perform its tasks at a rate of speed that is substantially faster than the tasks which the terminal device controller 80 must perform. The terminal device controller 80 counts the number of forward current interruptions to determine the called number. Since the loop current output of each line interface circuit 60 is connected to the terminal controller 80 through its own input, the terminal device controller 80 can determine the identity of the linefinder through which the call is being placed. This allows the terminal device controller 80 to correlate the linefinder calling number pair on bus 56 with the called number/linefinder pair from the line interface 60 to derive a called number/calling number pair. The terminal device controller 80 is programmed with the date, and it includes an internal clock so that it can determine the duration and time of day of the call. Accordingly, the internal time begins incrementing when the ANS signal from the line interface circuit 60 is detected responsive to the called party answering the call. The clock stops incrementing, and the call duration is noted, when neither the loop current LC signal nor the ANS signal from the line interface circuit 60 is present. The call data determined by the terminal device controller 80 may be applied to its own recording device, such as magnetic storage. Alternatively, it may be applied to a conventional computer or modem interface 82 which transmits a serial data stream to a larger record-keeping computer.

Figure 4A:
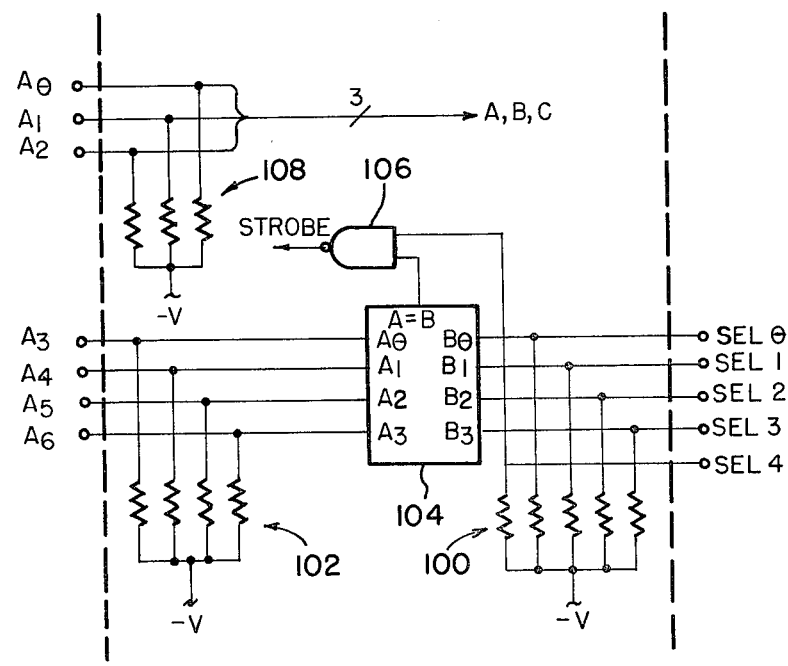

A schematic of the group A and B interface multiplexers 50a,50b and the L relay and CF relay interfaces 52 are illustrated in FIGS. 4A and 4B. Each interface multiplexer can apply eight of sixty-four lines to the data bus of the calling number identifier 54 as selected by the address bus of the calling number identifier 54. The entire system utilizes ten (or less) multiplexers on respective cards. The function of the multiplexer is determined by its card identity, which is automatically programmed in the multiplexer, depending upon its position in an equipment rack. Thus, for example, the L relay interface 52 for lines 1-50 may be designated "Card No. 1." With reference to FIG. 4A, each multiplexer has four inputs, designated SEL 0-3. All of the multiplexer cards are identical, but the function of the card is automatically programmed as it is placed in predetermined positions on the rack and its appropriate SEL pins are grounded. Thus, Card No. 1 would be programmed to function as the L relay interface for lines 1-50 by having its pin SEL 0 grounded, while the other pins remain floating. The group B interface multiplexer 50B might be designated "Card No. 16," in which case all SEL pins would be grounded. The calling number identifier selects the appropriate multiplexer by applying four address bits normally held low through pull-down resistors 102 to a comparator 104. The comparator compares the address to the pre-program card identifier and generates a high at its "A'B" output in the event of a match. Thus, the calling number identifier would select the card for examining L relay lines 1-50 by grounding A3 (if SEL 0 is grounded). Also, in the example above, the calling number identifier 54 would examine the group B interface lines by grounding address lines A3-A6. When the proper card is selected, NAND-gate 106 generates a STROBE output which causes multiplexer circuits to apply the selected lines to the data bus of the calling number identifier, as described in greater detail hereinafter. Each data bus bit may be connected to one of eight input points, depending upon the input selected by the low order address bits A0-A2. Thus, the high order address bits A3-A6 select the desired card (i.e., a set of fifty inputs), while the low order address bits A0-A2 select up to eight inputs to the card and apply them to the data bus.

The remaining portion of the multiplexer circuit is illustrated in FIG. 4B. The multiplexer circuit includes individual one-of-eight selectors 120-134, each of which receives eight incoming lines. Thus, for example, one-of-eight selector 120 receives the first eight L relay lines. Each selector 120 includes selector inputs A,B,C, which receive a binary code from the circuitry shown in FIG. 4A designating which of the eight incoming lines are applied to their output ports Y. The selectors 120-134 also receive the STROBE signal from the circuitry illustrated in FIG. 4A, which, upon receipt, apply the select input to the Y output.

The Y outputs of the selectors 120-134 are applied to respective level shifting and driving circuits 140-154, respectively. Only one of these circuits (140) is illustrated in detail, although all such circuits are identical. The Y output of the selector 120 is applied to the base of transistor 160 through resistor 162. A negative output from selector 120 allows the base of transistor 160 to be held low through resistor 164. Transistor 160 is thus held at cutoff, thereby allowing transistor 166 to be held at cutoff through resistor 168 so that the negative supply voltage is applied to the zero bit of the data bus through resistor 170. When the output of selector 120 goes high, transistor 160 is saturated, thereby drawing current through resistors 168 and 172, and connecting the data bus to ground through transistor 166.

The flow chart for the calling number identifier 54 is illustrated in FIG. 5A. The program is initialized at 200, in which variables are given values and various flags are set. The microprocessor in the calling number identifier 54 is interrupted every two milliseconds at 202, in which case the interrupt is serviced at 206 by all L relay and CF relay line values being applied from the L relay and CF interfaces 52 to a map which is merely a record of such values over a large number of intervals spaced two milliseconds apart. The circuitry for the line finder group A is then processed at 208, as described in greater detail below, and the circuitry for the group B line finders is then processed at 210 before returning from the interrupt at 212.

Processing of the group A and group B linefinders at 208,210, respectively, following interrupts, is illustrated in FIG. 5B. The J, K and B group relay lines and all line finder B relay lines are continuously examined at 214 in real time and numerically filtered, as described in greater detail below, at 214. The state of all linefinder B relay lines is then tested at 216, and if none are active, the program returns to process the circuitry for the next group or to wait for an interrupt. If any one of the ten line finder B relays has become active, as determined at 216, the rotary line for the group being processed is examined and filtered at 218. As explained above, rotary pulses are generated as the rotary linefinder switches step from one contact to the next until the appropriate line is found. If the program detects the leading edge of a new rotary pulse within a certain time at 220, then the current line map pointer is saved at 222. This designates the current line map entry as the point where examination of the L relay and CF relay lines will start. The program then returns to the main program at 224. At the start of each rotary pulse, the new pointer saved overwrites the previous pointer saved for the preceding pulse. As a result, when the rotary pulses are finished, this pointer represents the leading edge of the last rotary pulse, which is the earliest time that the L relay and CF relay transitions can occur for a found line. If the program does not detect the leading edge of a new rotary pulse within a certain time, then the current line map pointer is saved separately at 226 to designate the current line map entry as the last L relay and CF relay lines that will be examined. In other words, L relay and CF relay values are stored every two milliseconds for a relatively long period of time. When the last rotary pulse has been detected prior to $T_3$ (FIG. 2), the calling number identifier 54 can then determine that all L relay and CF relay samples taken before that time need not be numerically filtered. This is important because numerical filtering is relatively time-consuming, and elimination of this task for unneeded samples saves a great deal of processing time. The program then branches at 226 to return to the main program at 227 while waiting for the B relay to deactivate. When the B relay deactivates, the current line map pointer is saved at 228 to indicate the last relevant line map entry for filtering. As mentioned above, filtering is fairly time-consuming, so it is important that the L relay and CF relay lines be filtered only for the relevant period between $T_3$ and $T_8$ (FIG. 2). Thus, of the thousands of samples in the line map, relatively few are filtered. These are the points lying between the line map pointer saved at 222, designating the start of the relevant period, and the line map pointer saved at 228, designating the end of the relevant period.

The software then branches to 229, where the Line Filter Task is activated. The Line Filter Task (FIG. 5C) runs from 230 to 240 on a time-available basis; that is, during the time after one 2-millisecond interrupt, processing ends at 212 and before the next 2-millisecond interrupt occurs at 200. The Line Filter Task can continue processing the saved line map data while the linefinder goes on to a new line. The Line Filter Task only has to process the relevant portion of the line map. Furthermore, as described earlier, by examining the J, K and B group relays, it is possible to narrow the relevant L relay lines and CF lines to 50. To reiterate, each linefinder consists of two banks, a lower bank and an upper bank. The lower banks are connected to incoming lines 1–100, while the upper banks are connected to incoming lines 101–200. When the linefinders are accessing their lower bank, the group relay J for that line finder group is energized, thus indicating that the incoming line is between line 1 and line 100. When the linefinders are accessing their upper bank, the group relay K for that linefinder group is energized, thus indicating that the incoming line is between 101 and 200. Each linefinder contains ten rotary switches or "levels," and each level has ten rotary contacts. For the group A linefinders, the contacts are connected to the levels in numerical order. Thus, lines 1–10 are connected to the lowest level of the lower bank and lines 101–110 are connected to the lowest level of the upper bank. In contrast, the incoming lines are connected to the levels of the group B linefinders in reverse order. Thus, lines 1–10 are connected to the upper level of the lower bank for the group B linefinders, and lines 101–110 are connected to the upper level of the upper bank of the group B linefinders. Normally, the linefinders utilize only the first five levels in each bank. Thus, each group A linefinder normally accesses lines 1–50 in its lower bank and lines 101–150 in its upper bank. A group B linefinder normally accesses lines 51–100 in its lower bank and lines 151–200 in its upper bank. However, when all of the linefinders in a group are already connected to incoming lines and a call is placed on an incoming line normally accessed by that group, the other group linefinders can access the incoming line by stepping up to the upper five levels of a bank of levels. Under these circumstances, the B group relay is energized for that linefinder group. When a B group relay for the linefinder group is energized, an indication is thereby provided that the incoming lines being accessed by the currently busy linefinder in that group are from the upper five levels of either bank. Thus, when the B group relays are energized for the A group linefinders, the group A linefinders are accessing an incoming line that is between 51 and 100 or 151–200. By also examining the J and K group relays at 234, the identity of the incoming line can be narrowed down to fifty. This feature is used in step 236 of the Line Filter Task so that only the L relay and CF relay lines for fifty incoming lines need be filtered.

A flow chart of the line map filterig task activated at 229 is illustrated in FIG. 5C. The task is entered at 230, and the time limits of the filter range are set at 232 for the period from the start of the last rotary pulse (corresponding to the pointer saved at 222) and the end of a linefinder B relay energization (corresponding to the pointer saved at 228). The set of relevant lines for filtering are defined at 234 by examining the J, K and B group relays for the group being processed as described above. The fifty lines identified at 234 are then numerically filtered at 236 using an algorithm described below, and the result of the filtering is stored in a buffer. The contents of the buffer are transferred to the terminal device controller 80 at 238. Finally, the task ends at 240 and waits to be activated again.

Figure 5D:
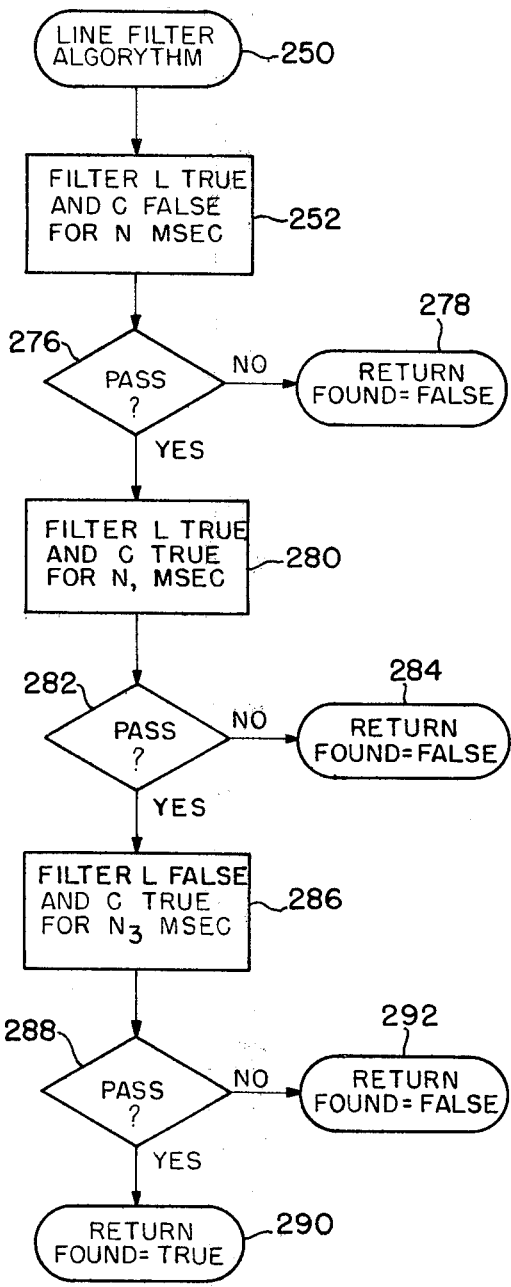
Figure 5E:
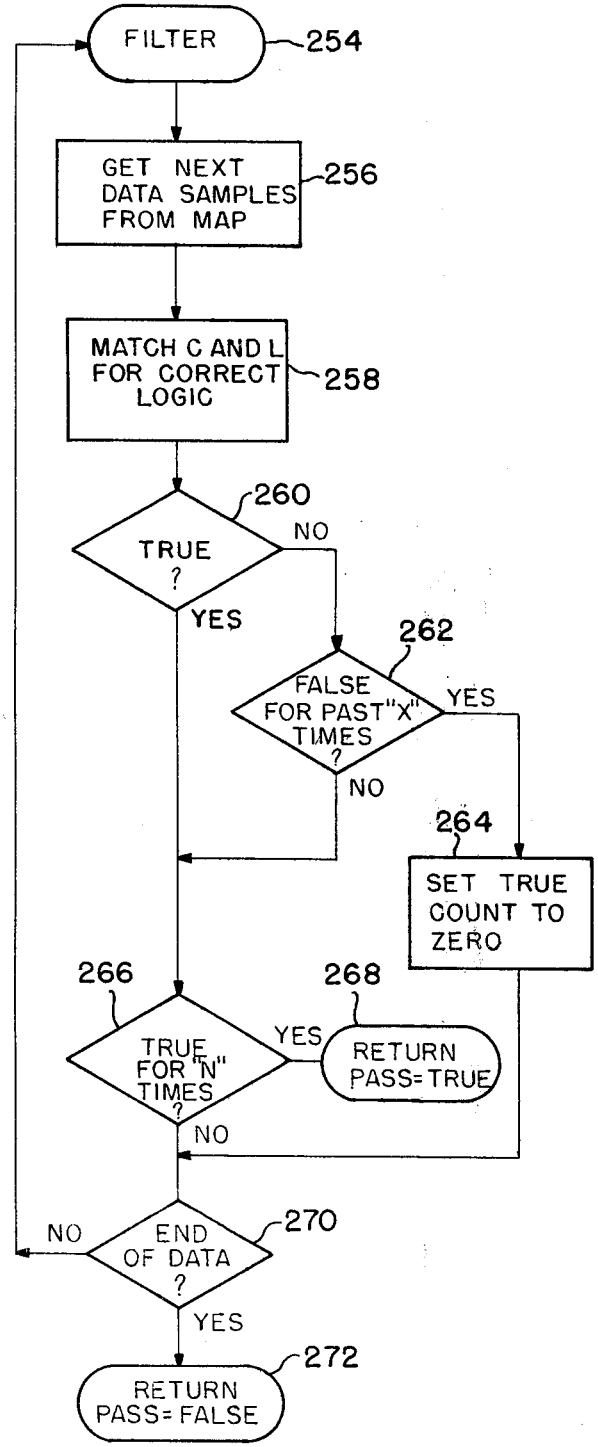

The filtering algorithm called at 236 is illustrated in the flow chart of FIG. 5D. The subroutine is entered at 250 and is performed once for each L relay and CF relay line for each incoming line in sequence. Thus, if lines 1–50 are identified as being the relevant set of lines, the filtering is first accomplished on the L relay and CF relay lines for line 1, then for line 2, then for line 3, etc. The subroutine first looks at 252 for the condition just prior to $T_3$ of FIG. 2, in which the L relay line is high (true) and the corresponding CF relay line is low (false). This is accomplished by the subroutine entered at 253, in which the L relay and CF relay samples for a line at the start of the relevant period are retrieved from the line map at 256. The condition of these samples is examined at 258, depending upon the condition being examined for. Thus, where the program is looking for an L relay true and CF relay false condition, the corresponding samples are matched at 258 and examined for the proper condition at 260. Assuming that the condition has not been met, the L relay and CF relay lines for the line being examined are once again examined at 262 for X successive samples, such as 2. If the condition is found to have not been met for X successive samples, an internal counter is set to 0 at 264. Basically, the filtering is accomplished by incrementing an internal counter each time the true condition is met and resetting that counter to 0 each time a successive number of false conditions occur. However, a single false condition is considered to be merely noise and is thus ignored. However, "X" successive falses cause the counter to start over. When the count has reached a predetermined number, the condition is considered true. If the count has not reached the predetermined number when all of the data samples from $T_3$ through $T_8$ have been processed, the condition is considered to be false. Thus, detection of a false condition at 262 for less than X times is ignored and the program branches to 266. However, if the condition is false for X successive samples, the counter is reset to 0 at 264. The number of times that the condition is true is counted at 266 until N successive samples have been true, at which time the program returns to 252, with the pass considered to be true. If the condition is not true for N successive times and the end of data is reached at 270, the program returns to 252 via 272, with the pass considered to be false. If the end of the data samples has not yet been reached, the program branches from 270 back to 256, where the next two data samples, taken two milliseconds later in time, are retrieved from the map. The program thus exits from the subroutine with either an indication that the condition that is being searched for is true or that the condition is false. If the condition is determined to be false at 276, the program returns to 238 via 278. If the condition is found to be true at 276 (i.e., a given L relay line active and the corresponding CF relay line inactive), the program proceeds to 280, where the filter subroutine is once again entered at 254. This time, the subroutine checks to determine if the line that was previously found to have an L relay line high and a CF relay line low subsequently has both the L relay line and the CF relay line high. If the filter subroutine does not pass this test, the program branches from 282 through 284 back to 238. If the subroutine has been found to have passed the test at 282, the program proceeds to 286, where the filter subroutine is once again performed to determine if the line previously found to have passed both of the previous tests now has its L relay line false and its CF relay line true during a subsequent point in time. If the condition is met, the test is determined to have passed at 288 and the program exits the subroutine at 290, indicating that the line connected to the linefinder having its B relay energized has been found. If the final test has not been passed, the program returns to 238 via 292. In this manner, the identity of the calling line and the linefinder connected to that line are stored in a buffer at 236, which is sent to the terminal device controller at 238.

Figure 6:
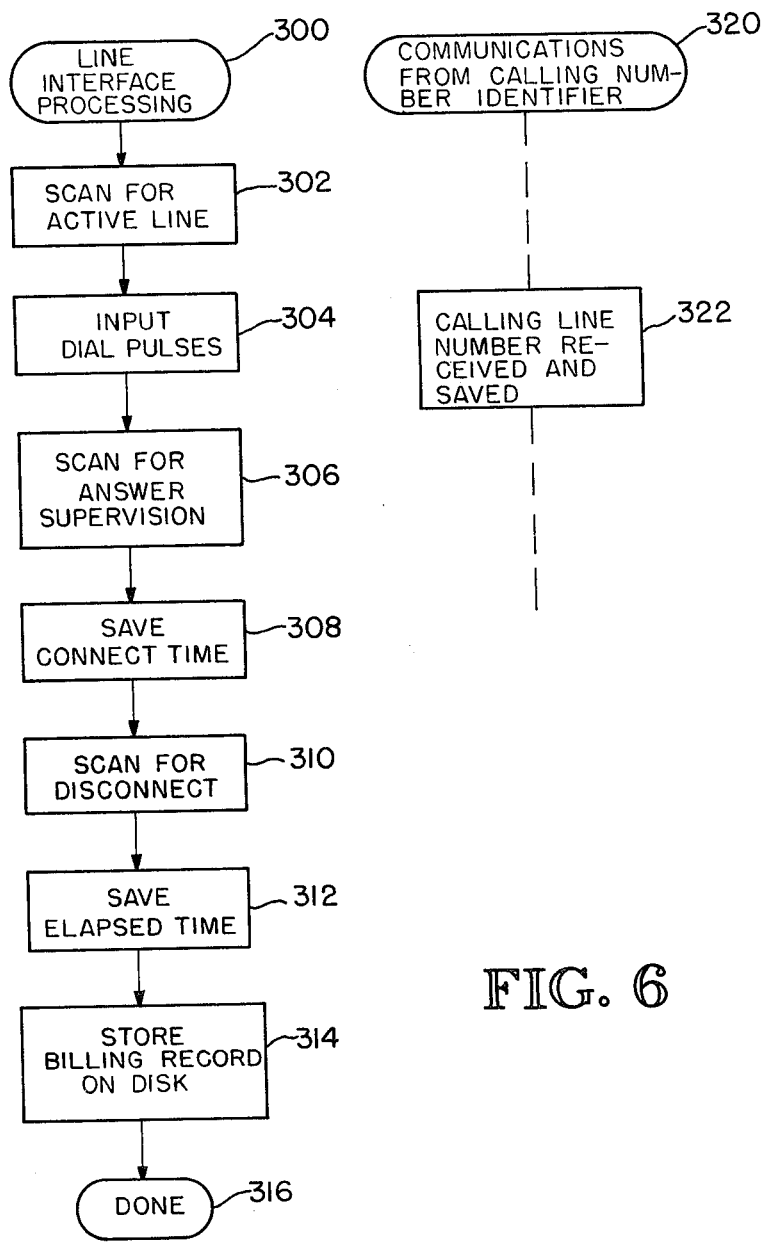
FIG. 6 is a flow chart of the software controlling the operation of the microprocessor-based terminal device controller used in the system of FIG. 1.

A flow chart for the software operating the terminal device controller is illustrated in FIG. 6. As explained above, the terminal device controller 80 performs basically two functions. First, it receives the dial pulses from the line interface and determines the called number. Second, it receives the line number and linefinder information from the calling number identifier 54 and correlates the called number to this data and outputs it to a data bus for transmission to either an internal or external record keeping device. The terminal device controller performs both of these functions asynchronously by sequentially performing a little bit of each processing step rather than finishing one processing step before going on to the next or by operating in an interrupt mode. The line interface processing software is entered at 300 and the line interface unit 60 for all linefinder output lines are scanned at 302 to determine if any of them are active, i.e., connected to an incoming line. After a linefinder has been connected to an incoming line, the calling station dials the called number, thereby generating dial pulses which are detected by the line interface 60. The terminal device controller 80 is connected to all line interface units 60 and it receives dial pulse signals from them at 304. After all digits of the called number have been dialed, the identity of the called number can be determined by the terminal device controller. Thereafter, the terminal device controller continues to scan the line interface unit 60 to look for respective ANS signals indicating that the called party has answered. This step is accomplished at 306, and the start time for the call is saved at 308. Thereafter, scanning of all line interface units 60 continues to determine when the loop current stops responsive to either the calling party or the called party going "on hook." It should be emphasized that the line interface unit for all linefinder outputs lines are scanned, even though only one linefinder at a time in each group can be in the process of accessing an incoming line. This is because all linefinders can be simultaneously active, and the incoming lines connected to these linefinders can all be simultaneously calling a number. The line interface units for these previously connected lines must be scanned to determine when the call is completed. The termination of the call is detected at 310 and the elapsed time is computed and saved at 312. Thereafter, a data record, including such information as the calling number, the called number, the time and date of the call, and the duration of the call, is stored at 314 and the program exits through 316. The other function provided by the terminal device controller is accomplished by first entering the subroutine at 320. Thereafter, at 322, the calling number is received from the calling number identifier 54 and saved for combining with the elapsed time and called number at 314 to complete the record. As mentioned above, the microprocessor in the terminal device controller 80 performs the functions entered at 300 and 320 essentially concurrently. That is, a a portion of the steps 300–316 are sequentially performed and then a portion of the steps from 320–332 are sequentially performed.

It will now be apparent that the major advantage of the universal measured service system is that the relatively expensive and complex called number identifier need be provided for only the relatively few linefinders. Providing a called number identifier for each incoming line would be substantially more expensive by at least a factor of 10. Further, it is not necessary to utilize a calling number identifier for each of the incoming lines.

We claim:

1. In a telephone central office exchange, a system having a plurality of linefinders, each connecting one of several incoming lines to an outgoing line of said linefinder, each of said linefinders having a B relay that is energized when said linefinder is attempting to connect an incoming line to an outgoing line, a set of group relays associated with and controlling the operation of one linefinder at a time as it attempts to connect an incoming line to an outgoing line, said system further including line equipment having a line relay and a cut-off relay for each incoming line, each of said line relays being energized to produce a line signal when a station associated with said incoming line is "off hook" and the corresponding cut-off relay is not energized, each of said cut-off relays being energized to produce a control signal when a linefinder has connected the corresponding incoming line to its outgoing line, a system for identifying a calling number associated with an incoming line and a number called on said incoming line, comprising:

line multiplexer means connected to said line relays for selectively applying respective signals from individual line relays to an output port;

cut-off multiplexer means connected to said cut-off relays for selectively applying respective signals from individual cut-off relays to an output port;

group multiplexer means connected to said group relays for selectively applying respective signals from said B relays to an output port;

called number decoder means connected to the output line of each linefinder for determining the number called by signals on said output lines;

processing means connected to the output ports of said line multiplexer means, cut-off multiplexer means, group multiplexer means, and called number decoder means for identifying line relays and corresponding cut-off relays that have changed state in a preset pattern within a predetermined time that a B relay for an identifiable linefinder changes state in order to identify the incoming line connected to each linefinder outgoing line and to determine the number called on each linefinder output line, thereby identifying a calling station connected to each incoming line and a number called by said calling station.

2. The system of claim 1 wherein said linefinders are arranged in two groups, each group of linefinders normally accessing a corresponding set of said incoming lines through five lower switch array levels in each of two banks of ten such switch array levels, each group of linefinders further accessing the set of incoming lines normally accessed by the other group of linefinders through five upper switch array levels in each of said banks in the event of a linefinder "busy" condition in which all of the linefinders in that group are already accessing an incoming line, said exchange further including a set of group relays for each group of linefinders for generating a first indicating signal when the linefinder in that group is attempting to access an incoming line through its lower bank of switch arrays, a second indicating signal when the linefinder in that group is attempting to access an incoming line through its upper bank of switch arrays, and a third indicating signal when the linefinder in that group is attempting to access an incoming line in the event of said linefinder "busy" condition, said system further including multiplexing means sensing for the presence of said first, second and third indicating signals from each set of group relays during a relevant period covering at least a portion of the time that the condition of said B relays, line relays, or cut-off relays are expected to change in order to identify the portion of the set of incoming lines containing the incoming line that is being accessed by the linefinder associated with said set of group relays.

3. The system of claim 1 wherein said processing means periodically records the condition of all of said line and cut-off relays during said relevant period, and said processing means looks for said preset pattern of state changes for only the line and cut-off relays identified by said first, second and third indicating signals.

4. The system of claim 1 wherein said processing means comprises:
calling number-identifying means receiving the signals at the output ports of said line relay, cut-off relay, and group relay multiplexer means for generating a data signal indicative of the incoming line connected to each linefinder outgoing line; and
controller means receiving the data signal from said calling number-identifying means and the outputs of said called number decoder means for correlating each called number with an incoming line and for providing a data signal indicative thereof.

5. The system of claim 3, further including interface means receiving the data signal from said controller means and converting said signal to a serial data stream for transmission to an external computer where said calling and called numbers are recorded with each other.

6. The system of claim 1 wherein said called number decoder means detects changes in the current through their respective outgoing lines, the number of such current changes being indicative of each digit of said called number, and wherein said processing means counts said current changes to determine said called numbers, said system further including tone-to-pulse converter means on each outgoing line of said linefinders to convert dual-tone multifrequency signaling tones on said incoming lines to a corresponding series of current changes that are detected by said called number decoder means and counted by said processing means.

7. The system of claim 1 wherein each set of group relays generates a series of rotary pulses when one of the linefinders in the corresponding group is accessing an incoming line, and wherein said pulses are applied to said processing means through said group multiplexing means, said processing means commencing the time period for the examination of said line, cut-off and linefinder relays by noting the termination of said rotary pulses.

8. In a telephone central office switching system having a plurality of linefinders each connecting one of several incoming lines to an outgoing line of said linefinder, each of said linefinders having a B relay that is energized when said linefinder is attempting to connect an incoming line to an outgoing line, a set of group relays associated with and controlling the operation of one linefinder at a time as it attempts to connect an incoming line to an outgoing line, said system further including line equipment having a line relay and a cut-off relay for each incoming line, each of said line relays being energized to produce a line signal when a station associated with said incoming line is "off hook" and the corresponding cut-off relay is not energized, each of said cut-off relays being energized to produce a control signal when a linefinder has connected the corresponding incoming line to its outgoing line, a process for identifying a calling number associated with an incoming line and a number called on said incoming line, comprising:
sensing the condition of the cut-off relays and line relays for all incoming lines and the B relays for all linefinders at a first point in time to identify incoming lines that are attempting to place a call but have not yet been connected to any outgoing line by a linefinder;
sensing the condition of the cut-off relays and the line relays for all incoming lines and the B relays for all linefinders at a second point in time corresponding to the approximate time required for a cut-off relay for an incoming line to de-energize the corresponding line relay to identify incoming lines that have been connected to a linefinder outgoing line within a predetermined period;
sensing the condition of the B relays for all linefinders at a third point in time corresponding to the approximate time required for a line relay for an incoming line to de-energize the B relay of a linefinder that is connecting the incoming line to its outgoing line in order to identify a linefinder that has connected an incoming line to its respective outgoing line within a predetermined period;
comparing the conditions of the line, cut-off and B relays at said first, second and third points in time to determine the identity of linefinders and respective incoming lines connected to outgoing lines by each linefinder;
determining the numbers called on each outgoing line of said linefinders; and
correlating the called numbers with the incoming lines placing the calls.

9. The process of claim 8 wherein said line finders are arranged in two groups, each group of linefinders normally accessing a corresponding set of said incoming lines through five lower switch array levels in each of two banks of ten such switch array levels, each group of linefinders further accessing the set of incoming lines normally accessed by the other group of linefinders through five upper switch array levels in each of said banks in the event of a linefinder "busy" condition in which all of the linefinders in that group are already accessing an incoming line, said exchange further including a set of group relays for each group of linefinders for generating a first indicating signal when the line finder in that group is attempting to access an incoming line through its lower bank of switch arrays, a second indicating signal when the linefinder in that group is attempting to access an incoming line through its upper bank of switch array, and a third indicating signal when all the linefinder in that group are busy, said process further including sensing for the presence of said first, second and third indicating signals from each set of group relays during said first, second or third points in time and examining the condition of only the line relays and cut-off relays indentified by said first, second and third indicating signals.

* * * * *